US010630620B2

(12) United States Patent
Mendes et al.

(10) Patent No.: US 10,630,620 B2
(45) Date of Patent: Apr. 21, 2020

(54) PERFORMING UPDATES TO ACTION ITEMS IN AN ELECTRONIC COMMUNICATION APPLICATION WITH A SINGLE INPUT

(71) Applicant: Microsoft Technology Licensing, LLC, Redmond, WA (US)

(72) Inventors: Roberto R. F. Mendes, Seattle, WA (US); Dipak Sarjerao Pawar, Bellevue, WA (US); Sunitha Kumari Kedar Prasad Gupta, Kirkland, WA (US); Jaskaran Singh, Redmond, WA (US); Sina Hakami, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 80 days.

(21) Appl. No.: 15/399,606

(22) Filed: Jan. 5, 2017

(65) Prior Publication Data

US 2018/0191648 A1     Jul. 5, 2018

(51) Int. Cl.
*H04L 12/58* (2006.01)
*G06Q 10/10* (2012.01)

(52) U.S. Cl.
CPC ........... *H04L 51/046* (2013.01); *G06Q 10/10* (2013.01); *G06Q 10/107* (2013.01); *G06Q 10/109* (2013.01); *G06Q 10/1095* (2013.01); *G06Q 10/1097* (2013.01); *H04L 51/22* (2013.01); *H04L 51/28* (2013.01)

(58) Field of Classification Search
CPC ....... H04L 51/046; H04L 51/22; H04L 51/28; G06Q 10/10; G06Q 10/107; G06Q 10/109; G06Q 10/1095; G06Q 10/1097

USPC .......................................................... 709/206
See application file for complete search history.

(56) References Cited

U.S. PATENT DOCUMENTS

| 7,555,526 | B1 | 6/2009 | Heidloff et al. |
| 8,010,613 | B2 | 8/2011 | Oral et al. |
| 2005/0172003 | A1* | 8/2005 | Richardson, Jr. ....... H04L 51/30 709/206 |
| 2007/0112926 | A1* | 5/2007 | Brett ................... G06Q 10/109 709/206 |
| 2010/0169447 | A1 | 7/2010 | Mermod et al. |
| 2012/0278381 | A1 | 11/2012 | Ferlitsch et al. |

(Continued)

OTHER PUBLICATIONS

Shirley Zhang, How to Auto Send a Notification Email WHen a Specific Task Is Completed in Outlook, Dec. 21, 2016, www.datanumen.com, https://www.datanumen.com/blogs/auto-send-notification-email-specific-task-completed-outlook/ (Year: 2016).*

(Continued)

*Primary Examiner* — Zi Ye

(57) ABSTRACT

Described is a system and method for automatically updating an action item in an electronic communication application using a single input or click from a user. In response to received input, an electronic communication having a mailto link is automatically generated. The mailto link includes the email address of the intended recipient, an identifier associated with the action item, and the update that is to be performed on the action item. The electronic communication is then automatically provided to the intended recipient and the update is performed on the action item.

20 Claims, 8 Drawing Sheets

(56) References Cited

U.S. PATENT DOCUMENTS

| | | | | |
|---|---|---|---|---|
| 2014/0052797 | A1* | 2/2014 | Lessard | H04L 51/18 |
| | | | | 709/206 |
| 2014/0219434 | A1* | 8/2014 | Youel | H04M 3/56 |
| | | | | 379/202.01 |

OTHER PUBLICATIONS

Hoffman, et al., "The Mailto URL Scheme; rfc2368.txt", Retrieved from <<https://tools.ietf.org/html/rfc2368>>, Jul. 1, 1998, 11 Pages.

Leiba, et al., "Sieve Notification Mechanism: Mailto; draft-ietf-seive-notify-mailto-10", Retrieved from <<https://tools.ietf.org/html/rfc5436>>, Dec. 4, 2008, 17 Pages.

"International Search Report and Written Opinion Issued in PCT Application No. PCT/US2018/012010", dated Mar. 9, 2018, 12 Pages. (MS# 400862-WO-PCT).

Velez, et al., "Lynx: An Open Email Extension for Workflow Systems Based on Web Services and its Application to Digital Government", International Conference on Internet and Web Applications and Services/Advanced International Conference on Telecommunications, Feb. 19, 2006, 6 Pages.

Jordan, Justine, "Quick Actions Allow Gmail Users to Convert Before Opening", https://litmus.com/blog/quick-actions-allow-gmail-users-to-convert-before-opening, Published on: May 30, 2013, 10 pages.

"One Click Actions", https://developers.google.com/gmail/markup/reference/one-click-action, Published on: May 28, 2015, 4 pages.

Dimon, Garrett, "Gmail Inbox Actions can improve your transactional emails", https://postmarkapp.com/guides/improve-your-transactional-emails-with-gmail-inbox-actions, Published on: Jul. 29, 2016, 25 pages.

Buda, Bradley, "A Guide to Setting up Gmail Inbox Actions", http://blog.meldium.com/home/2014/5/19/setting-up-gmail-inbox-actions, Published on: May 19, 2014, 9 pages.

Furgison, Lisa, "8 Components of an Effective Email [Guide]", http://www.verticalresponse.com/blog/8-components-effective-email/, Published on: Jun. 30, 2014, 13 pages.

"Emails and Actions", http://docs.ninjaforms.com/customer/en/portal/articles/2121401-emails-and-actions, Published on: Jul. 25, 2016, 19 pages.

"Outlook 2010—Cannot cancel a meeting as the organizer", https://social.technelmicrosoft.com/Forums/office/en-US/2e8ea847-8c8a-4217-b7c2-e8be56db0375/outlook-2010-cannot-cancel-a-meeting-as-the-organizer?forum=outlook, Retrieved on: Nov. 9, 2016, 25 pages.

Hodgekiss, Ros, "Tip: Avoid using mailto links in HTML email", https://www.campaignmonitor.com/blog/email-marketing/2013/06/tip-avoid-using-mailto-links-in-html-email/, Published on: Jun. 5, 2013, 4 pages.

"Description of common scenarios in which Calendar information may be removed from the Calendar or may be inaccurate", https://support.microsoft.com/en-in/kb/899704, Published on: Feb. 24, 2014, 16 pages.

"Understanding Meeting Updates", https://blogs.technet.microsoft.com/outlooking/2012/06/11/understanding-meeting-updates/, Published on: Jun. 11, 2012, 17 pages.

* cited by examiner

200

210 220 230 240 mailto:abc@outlook.com&subject=Action:ScheduleMeeting (REF:AAAA)&X-MS-AutoSend=true

PERFORMING UPDATES TO ACTION ITEMS IN AN ELECTRONIC COMMUNICATION APPLICATION WITH A SINGLE INPUT

BACKGROUND

In current email applications, there is not a mechanism that enables users to quickly and efficiently perform an update to various items in the email application and across various email clients. For example, there is not a mechanism whereby a user can provide an update to an email in an inbox, a calendar item, a task, a meeting request and so on. In most cases, a user must select a user interface (e.g., a calendar user interface) associated item to be updated, find and/or select the item to be updated, and select an update that is be performed on that item. In some cases, additional authentication steps are also required before a user can update the selected item. Each of these steps may require a user to provide various types of input to the email application.

It is with respect to these and other general considerations that embodiments have been described. Also, although relatively specific problems have been discussed, it should be understood that the embodiments should not be limited to solving the specific problems identified in the background.

SUMMARY

This disclosure generally relates to enabling users to create and update an action item in an electronic communication application on an electronic device using a single input, such as a click. For example, in some instances, the electronic communication application may be an email application that includes various email messages, calendar items, tasks, meeting requests and so on. Some of these action items may also be linked. For example, a meeting request or a calendar item may be associated with one or more tasks. The embodiments described herein are directed to creating and/or updating these items using a single input, such as, for example clicking on a link.

In embodiments, the electronic communication application generates a mailto link that includes various information about the action item (or action items) the user wants to create or update. For instance, the mailto link includes an email address of the intended recipient (typically the sender of the electronic communication), an identifier associated with the action items that are to be created or updated, an indication of what is to be created and/or the update that is to be performed on the various action items, and an indication that the electronic communication is to be automatically sent (in some cases, without opening a message compose form or screen). Once the mailto link is generated and selected, an email message is provided to an electronic communication server which parses the message, determines what is to be created and/or the updates that are to be performed on the various action items and generates a response. The response is returned to the electronic device and the action items are updated. The action item that is created or updated may be propagated across various electronic messaging application clients associated with the user.

Accordingly, disclosed herein is a system having a processing unit and a memory. The memory stores computer executable instructions which, when executed by the processing unit, causes the system to perform a method for updating action items in an electronic communication application. The method includes generating a mailto link for an electronic communication in an electronic communication application and appending a header to the mailto link that causes the electronic message to be automatically sent to an intended recipient without generating an electronic message compose form. Once the link is selected, the action item referenced in the mailto link is automatically updated.

Also disclosed is a method for updating an action item in an electronic communication application. This method includes receiving an input that indicates the action item that is to be updated and automatically generating a mailto link for an electronic communication. The mailto link includes an email address of the intended recipient, information about the action item that is to be updated, including an update to be performed on the action item, and an indication that the electronic communication is to be automatically sent to the intended recipient. Once the mailto link is generated, the electronic communication is transmitted to a remote computing device that parses the information in the electronic message to identify the update on the action item.

Also disclosed is an electronic communication for updating an action item in an electronic communication application. The electronic communication includes a mailto link comprising: an email address of an intended recipient, an identifier that is associated with the action item, a subject portion that indicates an update that is be performed on the action item, and an indication that the electronic communication is to be automatically sent to the intended recipient.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 2 illustrates an example mailto link that may be generated to create or update various action items of an electronic communication application using a single input according to an example embodiment.

DETAILED DESCRIPTION

Figure 1:
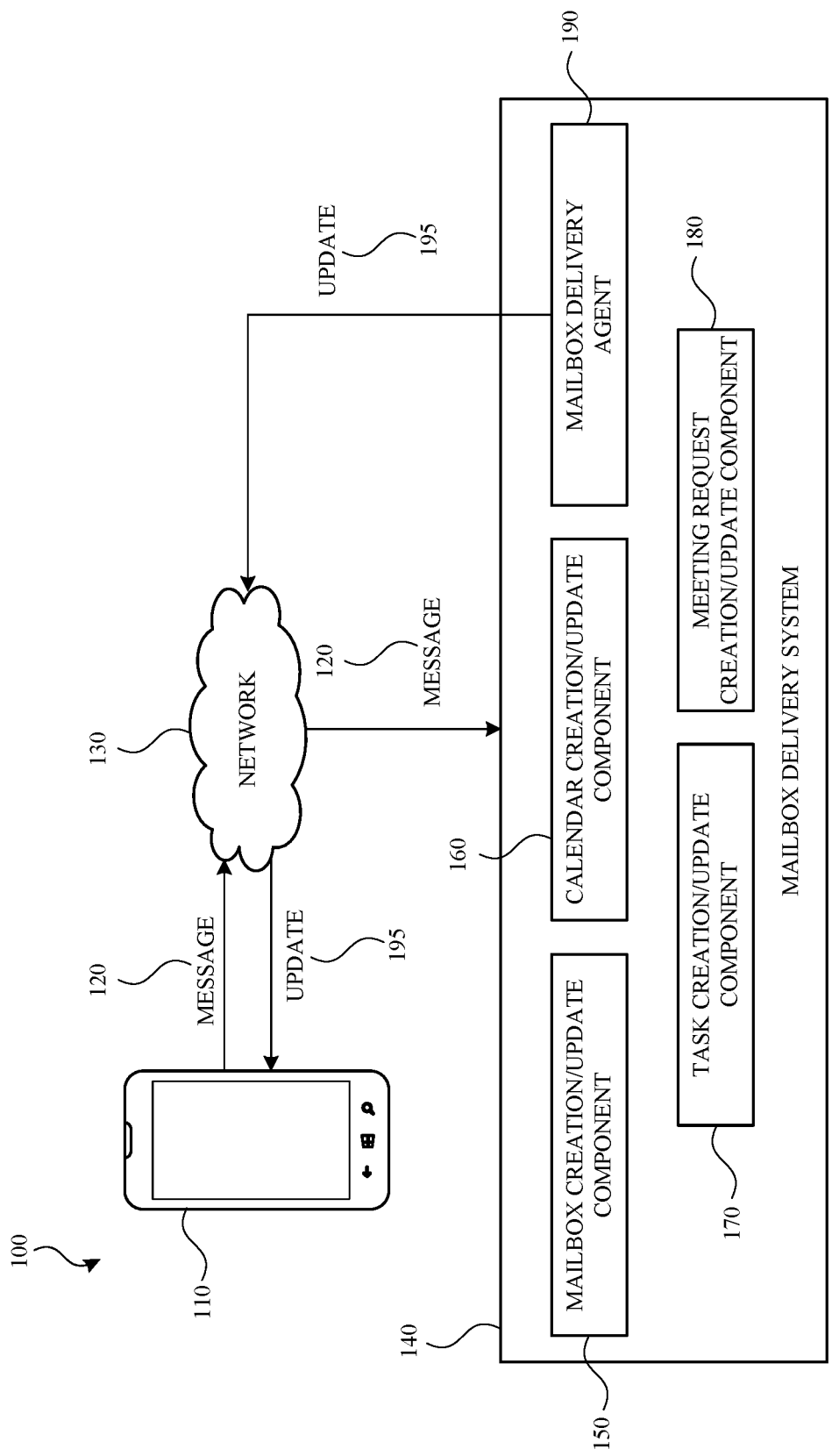
FIG. 1 illustrates a system for enabling single input creation or updates to an electronic communication application according to an example embodiment.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Embodiments described herein are directed to a method and system for enabling users of an electronic communication application to create and/or update one or more action items associated with the electronic communication application using a single input, such as click or other selection-type input. The electronic communication application may be an email application. The email application may be provided on a desktop computing device, a mobile computing device, a tablet computing device and so on. In some embodiments, the email application may be a web-based email application such as, for example, an Outlook web application by MICROSOFT CORP. of Redmond Wash. Although specific examples are given, the embodiments described herein may be used in various communication applications such as video messaging applications, chat applications, instant messaging applications, texting applications and so on.

The electronic communication application has one or more action items associated with it. These action items may be related to additional applications that are associated with the electronic communication application. The additional applications and associated action items may include: a calendar application having various calendar items (e.g., appointments); a task manager that displays one or more tasks or items; a meeting manager that creates, organizes, updates and cancels meetings; a contacts application that adds, updates and/or removes various contacts; a mailbox that shows various electronic messages that have been sent, deleted and/or received by a user and so on.

In current electronic communications applications, creation of an action item or an update to one or more action items has to be done manually and requires a user to provide various types of input. For example, in order to update an action item, a user typically has to navigate to the additional application, select a particular action item to be updated, select the update to the action item, and confirm the selection and the update. Additionally, the electronic communication application may require various forms of authentication to take place prior to performing the update on the selected action item.

In contrast to the above, the embodiments of the present disclosure enable a user to create and/or select a "mailto" link that automatically creates and/or updates one or more action items of the additional applications in the electronic communication application. In some embodiments, the mailto link is created in response to a user selecting the action item to be updated or in response to a user requesting that an action item be created. In response to the selection, the mailto link is automatically generated and when selected, causes the action items to be automatically created and/or updated without further input from the user.

Mailto is a standard protocol that is understood by various electronic communication clients. However, in the present disclosure, the mailto link is appended with information that causes the electronic communication application to create or update the various action items—regardless of whether a user is currently using the electronic communication application or is using another application (e.g., a separate calendar application on a mobile phone or other device). For example, the mailto link also includes information about the intended recipient (typically the user that is creating or updating the action item), an identifier that is associated with the action item and information about the update that is to be performed on the action item or what type of action item is to be created.

When the mailto link is generated and selected, an electronic message is automatically generated and sent to a mailbox delivery system. In some embodiments, the electronic message is generated without displaying an electronic message compose form or other such display to the user. The electronic message includes information about the action item to be created or updated. In other embodiments, the mailto link is embedded in the electronic message itself.

When the mailbox delivery system receives the electronic message, the information contained in the message is parsed or otherwise analyzed to determine which action items are to be created or updated. The information also indicates the update that is to be performed on the action items. Various components associated with the mailbox delivery system are used to create and update the various action items and generate a message containing the relevant information. The message is then provided to the requesting computing device. Upon receipt of the message, the electronic communication application executing on computing device uses the received message to create or update the action items.

In some embodiments, although a message is provided to the requesting device, the message, with the updated action items, is not shown in the inbox of the electronic communication application. Further, the creation or the updates are performed without various authentication steps that may be required when creating action items or providing updates to various action items.

These and other embodiments will be discussed in more detail with respect to the figures below.

FIG. 1 illustrates an example system 100 that enables a user to create or update one or more action items in an electronic communication application according to an example embodiment. As shown in FIG. 1, the system includes a computing device 110. In the embodiment shown, the computing device 110 is a mobile computing device although other computing devices may be used. These computing devices include, but are not limited to, mobile telephones, smart phones, tablet computing devices, smart watches, wearable computers, personal computers, desktop computers, laptop computers, gaming devices (e.g., Xbox®) and computers, televisions, or any other device that may use or otherwise execute electronic communication applications.

The computing device 110 may be used to execute an electronic communication application that enables a user of the computing device 110 to send and receive various types of electronic communications, such as email, text messages, video messages, audio messages and other forms of electronic communication. The electronic communication application may be a web application (e.g., Outlook web application by MICROSOFT CORP. of Redmond, Wash.) or a desktop application (e.g., Outlook desktop application by MICROSOFT CORP. of Redmond, Wash.).

In some instances, the electronic communication application includes various additional applications that provide additional features to a user. These additional applications may include a calendar application, a contacts application, a meeting application, a tasks application, an inbox for displaying received electronic communications and so on. Each of these applications include various action items. For example, the calendar application may include one or more appointment action items, the contacts application may include one or more contact action items, a task application may include one or more task action items, the meeting application may include one or more meeting action items, the inbox may include one or more electronic message action items and so on.

In some embodiments, each action item may be created, updated, deleted, canceled, flagged or otherwise marked and so on. For example, a task may be created, marked as complete, edited, or deleted. Likewise, a calendar item in a calendar application may be removed from the calendar, added to the calendar, updated with a new date and/or time and so on.

Additionally, the electronic communication application may have an inbox that lists one or more received electronic messages. These messages may be deleted, marked as unread or read, flagged and so on. Although specific examples are given, the embodiments described herein may be applied to various other applications that may be part of an electronic communication application.

In some cases, it may be desirable to create or provide an update to one or more action items in the electronic communication application. When an update to an action item is required, the system 100 enables a user to update the action item with a single input, such as a click or selection of an automatically generated link, button, icon and so on. The update may be propagated across a number of computing devices and a number of electronic communication applications. For example, a user may be executing a web version of an electronic communication application on a mobile computing device but also use a desktop version of the electronic communication application on a different computer. Likewise, a user may be able to create a new action item such as described. The newly created action items may also be propagated across a number of computing devices.

Each of these electronic communication applications may have similar tasks, calendar items, contacts, email messages and so on. In another implementation, the user may access two different electronic communication applications (e.g., from different providers). In either case, when an action item is created or updated, the corresponding information is provided via one electronic communication application and may also be automatically provided to the other electronic communication application.

In some instances, various action items from different applications may be related. For example, in preparation for a meeting, one or more tasks may need to be performed by the user. Further, various email messages may be related to the meeting. In the embodiments described herein, an update to one of the action items may cause the related action items to be updated accordingly. For example, if the meeting is canceled, the various tasks associated with the meeting may be automatically deleted. Likewise, if a meeting is created, one or more tasks associated with the meeting may also be created using a single input such as a click.

As described above, creation of or an update to the various action items may be provided by a single input from a user. For example, a user may select, or otherwise indicate, the action item to be created or updated on the computing device 110. In some implementations, the action item may be displayed in the electronic communication application. In another implementation, the action item may be displayed in a different application.

Once the action item is selected, the computing device generates a mailto link that includes information about the action item that is to be created or updated. More specifically, the mailto link is appended with headers or other information that includes an email address of the intended recipient (typically an email address of the user that is requesting the update) and an identifier associated with the action item to be created or updated. The mailto link also includes information of the type of action item to be created or the updates to the action item.

In some instances, an "autosend" header is also appended to the mailto link. The autosend header causes the electronic message to be transmitted to a mailbox delivery system 140 over a network 130 without showing or otherwise providing an electronic message compose form to the user. That is, the computing device 110 may generate and send an electronic message that contains the information about the action item to be updated without displaying the electronic message to the user. Likewise, when a message containing the creation of or the update to the action item is provided back to the electronic device 110, the message is not displayed in an inbox of the electronic communication application.

Figure 2:
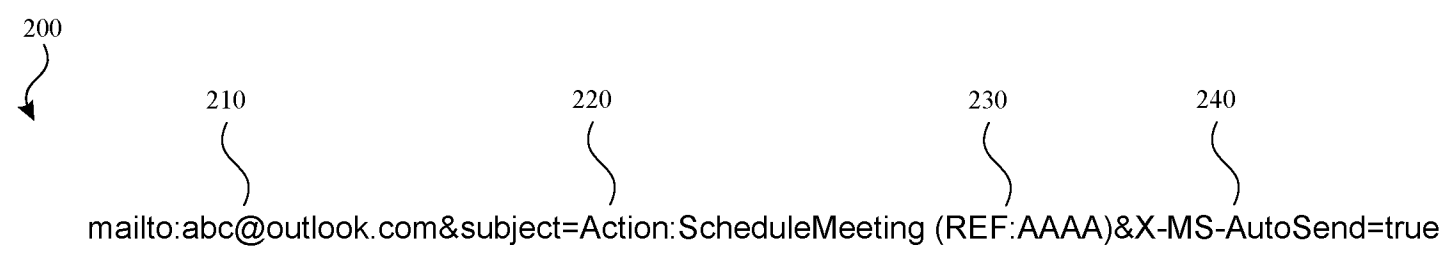

FIG. 2 illustrates an example mailto 200 link that may be generated by the electronic communication application that is executing on the computing device 110. As shown, the mailto link 200 includes an email address 210 (or other contact information) for the intended recipient. In this example, the email address is "abc@outlook.com."

In some embodiments, and for security purposes, the electronic communication application may check the intended recipient email address 210 in the mailto link 200 and compare it with the email address of the sender or the composer of the electronic message. In some cases, the electronic message is only sent to the intended recipient if the email addresses match. Although a single email address is shown, the mailto link may include any number of email addresses or other contact information (e.g., phone numbers, user names, and so on) of the intended recipient.

The mailto link 200 also includes an action 220 (e.g., creation of an action item or an update) that is to be performed. In the example shown in FIG. 2, the action 220 is for creating or otherwise scheduling a meeting (e.g., "Action:ScheduleMeeting"). In some implementations, the action may be provided in a subject line of the email message that is generated in response to the mailto link being selected. Although the mailto link 200 includes a single action 220, multiple actions for a single action item, or for multiple action items may be provided. Further, although creating or scheduling a meeting action is specifically mentioned, various other actions may be performed. These include, but are not limited to, canceling a meeting, updating a meeting, deleting an email, updating a task, creating a task, canceling a task and so on.

The mailto link 200 also includes an identifier 230 or reference to the action item that is to be created or updated. In the example shown in FIG. 2, the identifier is "AAAA." Thus, when the meeting is scheduled, it will be associated with this identifier. In cases where multiple actions 220 are to be performed on various action items, the mailto link 200 will include identifiers for each action item along with the desired update or other indication as to what action item is to be created. For example, if one meeting is to be scheduled and another one is to be canceled, the mailto link could include "Action:ScheduleMeeting (REF:AAAA),Action:CancelMeeting (REF:AAAB)."

The mailto link 200 also includes an autosend header 240. In this example, the autosend header is "X-MS-AutoSend=true." This 240 header is used to indicate that the generated electronic message, with the embedded mailto link 200 is to be automatically sent to the intended recipient 210 (e.g., abc@outlook.com) without opening a compose form. In some instances, this header 240 also causes a response message that is received by the computing device not to appear in the inbox of the electronic communication application.

Referring back to FIG. 1, when the mailto link (e.g., mailto link 200) is selected, an electronic message 120 is generated. In some embodiments, the electronic message 120 includes the mailto link and/or other information contained in the mailto link. The electronic message 120 is transmitted, through the network 130, to the mailbox delivery system 140. The mailbox delivery system 140 parses the information contained in the electronic message 120 and determines what action items are to be created or updated.

More specifically, the mailbox delivery system 140 may include various components that are used to create or update the identified action item(s). For example, the mailbox delivery system 140 may include a mailbox creation/update component 150 that creates or updates one or more electronic messages stored by the electronic communication application, a calendar creation/update component 160 that creates or updates one or more calendar action items associated with the electronic communication application, a task creation/update component 170 that creates or updates one or more task action items associated with the electronic communication application, and a meeting request creation/update component 180 that creates or updates one or more meeting action items associated with the electronic communication application.

Continuing with the example above using mailto link 200 shown in FIG. 2, once the mailto link 200 is selected and a message 120 is generated, the mailbox delivery system 140 passes the "ScheduleMeeting" action 220 and the meeting identifier 230 "AAAA" to the meeting request creation/update component 180. The meeting request creation/update component 180 creates the identified action item (e.g., schedules a meeting and associates it with the AAAA identifier). In cases where multiple action items are provided, multiple creations and updates may be performed. For example, if the electronic message includes an update (e.g., to cancel the meeting associated with the identifier AAAB), that update is also performed by the appropriate component (in this case, the meeting request creation/update component 180).

The mailbox delivery agent 190 generates an update 195 (or an indication that an action item has been created) and provides it to the computing device 110. The update 195 is then reflected in the electronic communication application. In some cases, the update 195 is provided in an electronic message. However, when the electronic message is received by the computing device 110, it does not appear in an inbox associated with the electronic communication application. Thus, the process of updating the various action items is transparent to the user.

In some embodiments and as discussed above, a particular action item may be associated with one or more additional action items. For example, the meeting that is identified by the identifier 230 AAAA (FIG. 2) may be associated with one or more tasks. In such cases, the mailbox delivery system may determine that a task identified as "BBBB" is associated with the meeting. In such cases, the task creation/update component 170 may update the task identified as BBBB once the meeting request creation/update component 180 schedules the meeting identified as AAAA. The mailbox delivery agent 190 may provide an update 195 that reflects both changes.

Although the mailbox delivery system 140 is shown as being separate from the computing device 110, it is contemplated that the various components contained in the mailbox delivery system 140 may be provided on the mobile computing device itself. In such implementations, the computing device 110 may generate a message 120 when a mailto link is generated and/or selected, the mailbox box delivery system 140 may receive and parse the message 120, and subsequently transmit an update 195 message to the various components on the computing device 110.

Regardless of the implementation, the update 195 may be propagated across a number of different electronic communication application clients associated with the user. For example, the updates to the various action items may be provided to a web-based electronic communication application and a desktop version of the electronic communication application.

Figure 3:
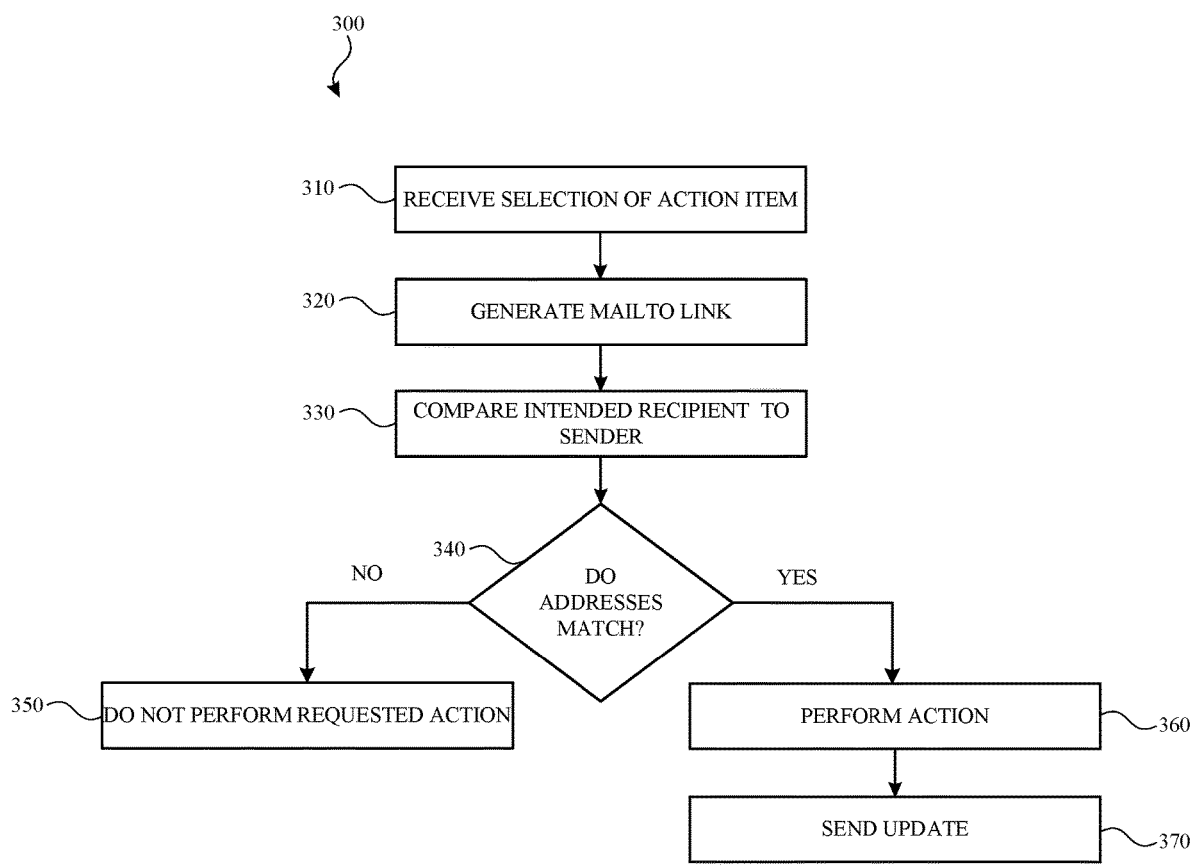
FIG. 3 illustrates a method for creating or updating an action item in an electronic communication application in response to a single received input according to an example embodiment.

FIG. 3 illustrates a method 300 for creating and/or updating an action item in an electronic communication application according to one or more embodiments of the present disclosure. The method 300 may be used by the system 100 described above with respect to FIG. 1. Further, the method 300 may be executed when a mailto link (e.g., mailto link 200 of FIG. 2) is generated and/or selected based on a single user input (e.g., a single click or other selection input on the mailto link 200).

Method 300 begins at operation 310 in which selection of an action item is received. In some embodiments, the selection of the action item is based, at least in part, on user input. For example, the user may access a calendar application associated with the electronic communication application and want to create a new meeting or remove a meeting that is displayed on the calendar application.

Once the action item is selected or otherwise identified, flow proceeds to operation 320 and a mailto link is automatically generated. The mailto link includes an email address (or other communication address such as, for example, a user name, a phone number, etc.) of the intended recipient, an action or update to be performed on the action item, and an action item identifier. In some embodiments, the action that is to be performed on the action item is indicated in the subject line of the electronic message that is sent when the mailto link is selected. The mailto link also includes header information indicating that the electronic message should be automatically sent without generating a compose form or other such display item for the electronic message.

Once the mailto link is generated and/or selected, flow proceeds to operation 330 and the email address of the intended recipient is compared with that of the sender. In some embodiments, both email addresses must be the same in order for the action item to be created or for the update to occur. In other embodiments, multiple email addresses may be provided in the mailto link and the update may be provided to a number of different users. In such cases, additional authentication procedures to verify the identity of the sender may be implemented.

Flow then proceeds to operation 340 and a determination is made as to whether the intended recipient's email address matches that of the sender. If they are not the same, flow proceeds to operation 350 and the requested action is not performed. For example, a mailto link is not generated or communicated to the intended recipient in an electronic message. However, in some embodiments, if the email addresses do not match, a determination may be made that the email to be sent is a normal email and as such, creation or an update of an action item will not occur even though the email is still sent to the intended recipient.

However, if it is determined in operation 340 that the email addresses match, flow proceeds to operation 360 and the requested action is performed. Flow then proceeds to operation 370 and the update (e.g., the creation or update of the action item or on multiple action items) is performed such as described above. In some embodiments, the update are reflected in the various applications associated with the electronic communication application.

It is contemplated that some electronic messaging clients may not support the autosend feature described above. In such cases, the electronic communication client may ignore the header and generate a message compose form. In such cases, the generated message may include the various pieces of information described above. For example, the subject line of the email may include the action to be performed on the action item and the identifier of the action item. Likewise, the "to" field may be populated with the email address of the intended recipient. Once the user sends the generated electronic message, the message may be processed such as described above. The updates may also be received in a similar manner such as described above.

FIGS. 4-7 and the associated descriptions provide a discussion of a variety of operating environments in which aspects of the disclosure may be practiced. However, the devices and systems illustrated and discussed with respect to FIGS. 4-7 are for purposes of example and illustration and are not limiting of a vast number of electronic device configurations that may be utilized for practicing aspects of the disclosure, as described herein.

Figure 4:
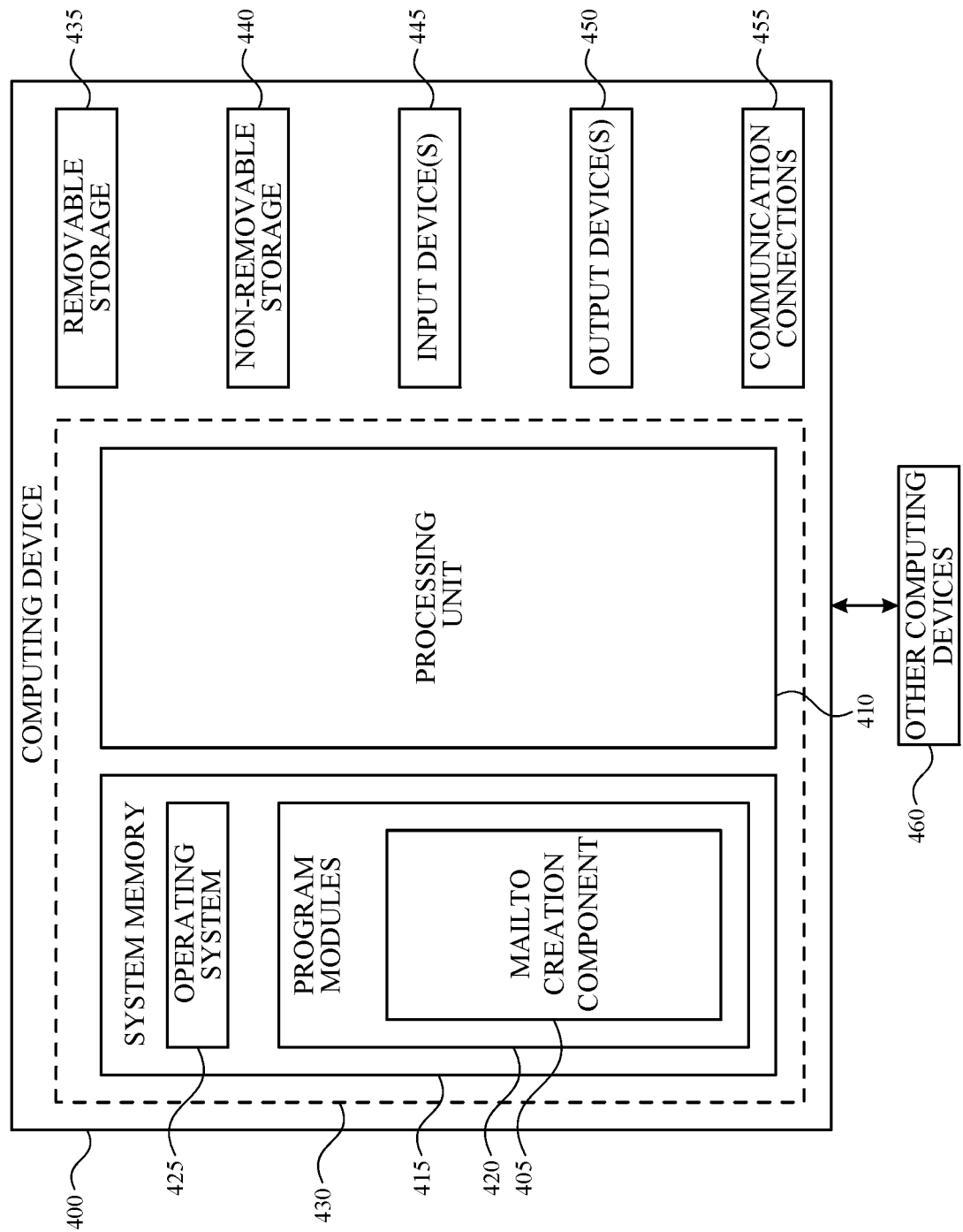
FIG. 4 is a block diagram illustrating example physical components of a computing device with which aspects of the disclosure may be practiced.

FIG. 4 is a block diagram illustrating physical components (e.g., hardware) of an electronic device 400 with which aspects of the disclosure may be practiced. The components of the electronic device 400 described below may have computer executable instructions for generating a mailto link in an electronic communication application such as described above.

In a basic configuration, the electronic device 400 may include at least one processing unit 410 and a system memory 415. Depending on the configuration and type of electronic device, the system memory 415 may comprise, but is not limited to, volatile storage (e.g., random access memory), non-volatile storage (e.g., read-only memory), flash memory, or any combination of such memories. The system memory 415 may include an operating system 425 and one or more program modules 420 suitable for parsing received input, determining subject matter of received input, determining actions associated with the input and so on.

The operating system 425, for example, may be suitable for controlling the operation of the electronic device 400. Furthermore, embodiments of the disclosure may be practiced in conjunction with a graphics library, other operating systems, or any other application program and is not limited to any particular application or system. This basic configuration is illustrated in FIG. 4 by those components within a dashed line 430.

The electronic device 400 may have additional features or functionality. For example, the electronic device 400 may also include additional data storage devices (removable and/or non-removable) such as, for example, magnetic disks, optical disks, or tape. Such additional storage is illustrated in FIG. 4 by a removable storage device 435 and a non-removable storage device 440.

As stated above, a number of program modules and data files may be stored in the system memory 415. While executing on the processing unit 410, the program modules 420 (e.g., the content sharing module 405) may perform processes including, but not limited to, the aspects, as described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality, described herein, with respect to the capability of the client to switch protocols may be operated via application-specific logic integrated with other components of the electronic device 400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The electronic device 400 may also have one or more input device(s) 445 such as a keyboard, a trackpad, a mouse, a pen, a sound or voice input device, a touch, force and/or swipe input device, etc. The output device(s) 450 such as a display, speakers, a printer, etc. may also be included. The aforementioned devices are examples and others may be used. The electronic device 400 may include one or more communication connections 455 allowing communications with other electronic devices 460. Examples of suitable communication connections 455 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 415, the removable storage device 435, and the non-removable storage device 440 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 400. Any such computer storage media may be part of the electronic device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 5A:
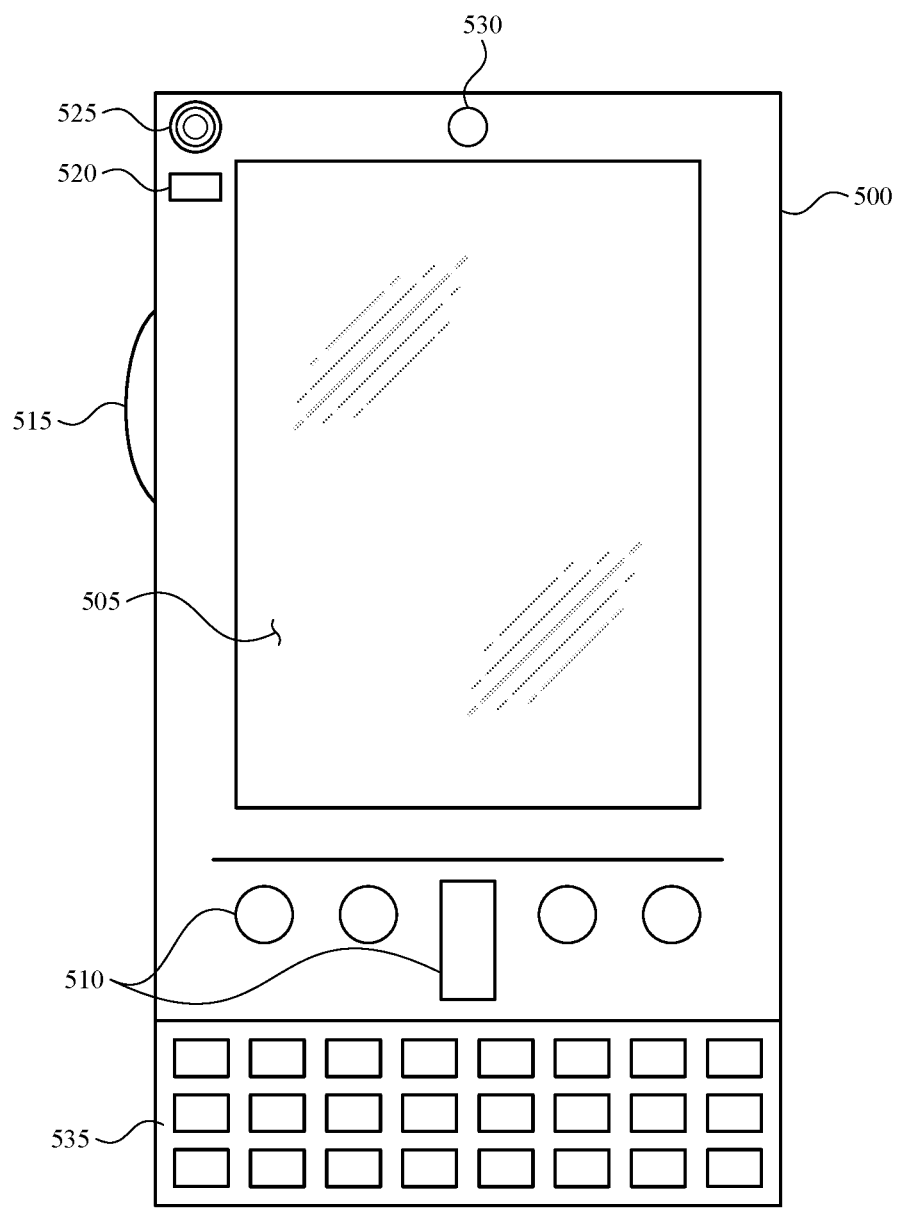
FIGS. 5A and 5B are simplified block diagrams of a mobile computing device with which aspects of the present disclosure may be practiced.
Figure 5B:
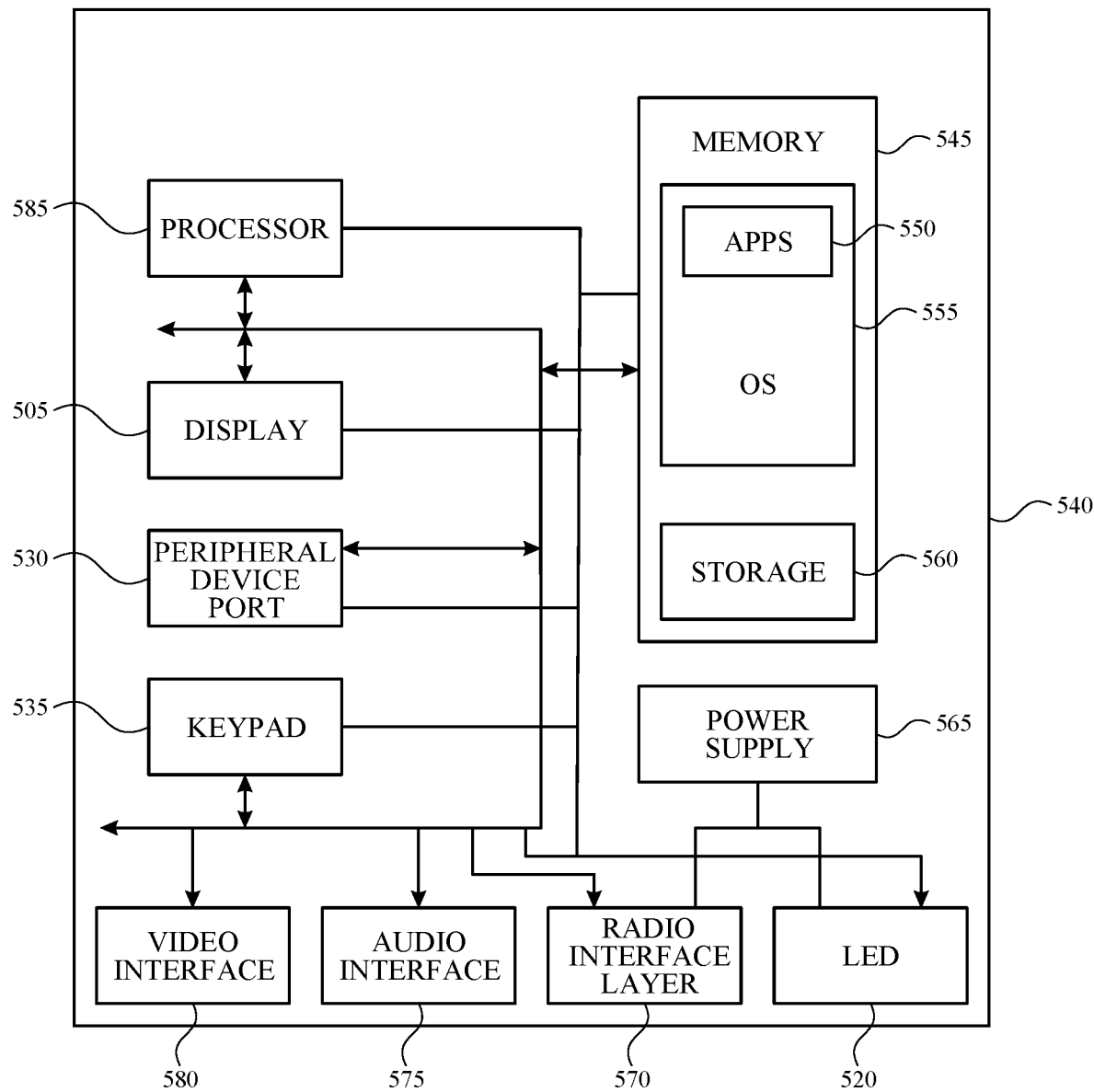

FIGS. 5A and 5B illustrate a mobile electronic device 500, for example, a mobile telephone, a smart phone, wearable computer (such as a smart watch), a tablet computer, a laptop computer, and the like, with which embodiments of the disclosure may be practiced. With reference to FIG. 5A, one aspect of a mobile electronic device 500 for implementing the aspects is illustrated.

In a basic configuration, the mobile electronic device 500 is a handheld computer having both input elements and output elements. The mobile electronic device 500 typically includes a display 505 and one or more input buttons 510 that allow the user to enter information into the mobile electronic device 500. The display 505 of the mobile electronic device 500 may also function as an input device (e.g., a display that accepts touch and/or force input).

If included, an optional side input element 515 allows further user input. The side input element 515 may be a rotary switch, a button, or any other type of manual input element. In alternative aspects, mobile electronic device 500 may incorporate more or less input elements. For example, the display 505 may not be a touch screen in some embodiments. In yet another alternative embodiment, the mobile electronic device 500 is a portable phone system, such as a cellular phone. The mobile electronic device 500 may also include an optional keypad 535. Optional keypad 535 may be a physical keypad or a "soft" keypad generated on the touch screen display.

In various embodiments, the output elements include the display 505 for showing a graphical user interface (GUI), a visual indicator 520 (e.g., a light emitting diode), and/or an audio transducer 525 (e.g., a speaker). In some aspects, the mobile electronic device 500 incorporates a vibration transducer for providing the user with tactile feedback. In yet another aspect, the mobile electronic device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one aspect of a mobile electronic device 500. That is, the mobile electronic device 500 can incorporate a system (e.g., an architecture) 540 to implement some aspects. In one embodiment, the system 540 is implemented as a "smart phone" capable of running one or more applications (e.g., browser, e-mail, calendaring, contact managers, messaging clients, games, media clients/players, content selection and sharing applications and so on). In some aspects, the system 540 is integrated as an electronic device, such as an integrated personal digital assistant (PDA) and wireless phone.

One or more application programs 550 may be loaded into the memory 545 and run on or in association with the operating system 555. Examples of the application programs include phone dialer programs, e-mail programs, personal information management (PIM) programs, word processing programs, spreadsheet programs, Internet browser programs, messaging programs, and so forth.

The system 540 also includes a non-volatile storage area 560 within the memory 545. The non-volatile storage area 560 may be used to store persistent information that should not be lost if the system 540 is powered down.

The application programs 550 may use and store information in the non-volatile storage area 560, such as email or other messages used by an email application, and the like. A synchronization application (not shown) also resides on the system 540 and is programmed to interact with a corresponding synchronization application resident on a host computer to keep the information stored in the non-volatile storage area 560 synchronized with corresponding information stored at the host computer.

The system 540 has a power supply 565, which may be implemented as one or more batteries. The power supply 565 may further include an external power source, such as an AC adapter or a powered docking cradle that supplements or recharges the batteries.

The system 540 may also include a radio interface layer 570 that performs the function of transmitting and receiving radio frequency communications. The radio interface layer 570 facilitates wireless connectivity between the system 540 and the "outside world," via a communications carrier or service provider. Transmissions to and from the radio interface layer 570 are conducted under control of the operating system 555. In other words, communications received by the radio interface layer 570 may be disseminated to the application programs 550 via the operating system 555, and vice versa.

The visual indicator 520 may be used to provide visual notifications, and/or an audio interface 575 may be used for producing audible notifications via an audio transducer (e.g., audio transducer 525 illustrated in FIG. 5A). In the illustrated embodiment, the visual indicator 520 is a light emitting diode (LED) and the audio transducer 525 may be a speaker. These devices may be directly coupled to the power supply 565 so that when activated, they remain on for a duration dictated by the notification mechanism even though the processor 585 and other components might shut down for conserving battery power. The LED may be programmed to remain on indefinitely until the user takes action to indicate the powered-on status of the device.

The audio interface 575 is used to provide audible signals to and receive audible signals from the user (e.g., voice input such as described above). For example, in addition to being coupled to the audio transducer 525, the audio interface 575 may also be coupled to a microphone to receive audible input, such as to facilitate a telephone conversation. In accordance with embodiments of the present disclosure, the microphone may also serve as an audio sensor to facilitate control of notifications, as will be described below.

The system 540 may further include a video interface 580 that enables an operation of peripheral device 530 (e.g., on-board camera) to record still images, video stream, and the like. The captured images may be provided to the artificial intelligence entity advertisement system such as described above.

A mobile electronic device 500 implementing the system 540 may have additional features or functionality. For example, the mobile electronic device 500 may also include additional data storage devices (removable and/or non-removable) such as, magnetic disks, optical disks, or tape. Such additional storage is illustrated in FIG. 5B by the non-volatile storage area 560.

Data/information generated or captured by the mobile electronic device 500 and stored via the system 540 may be stored locally on the mobile electronic device 500, as described above, or the data may be stored on any number of storage media that may be accessed by the device via the radio interface layer 570 or via a wired connection between the mobile electronic device 500 and a separate electronic device associated with the mobile electronic device 500, for example, a server computer in a distributed computing network, such as the Internet. As should be appreciated such data/information may be accessed via the mobile electronic device 500 via the radio interface layer 570 or via a distributed computing network. Similarly, such data/information may be readily transferred between electronic devices for storage and use according to well-known data/information transfer and storage means, including electronic mail and collaborative data/information sharing systems.

As should be appreciated, FIG. 5A and FIG. 5B are described for purposes of illustrating the present methods and systems and is not intended to limit the disclosure to a particular sequence of steps or a particular combination of hardware or software components.

Figure 6:
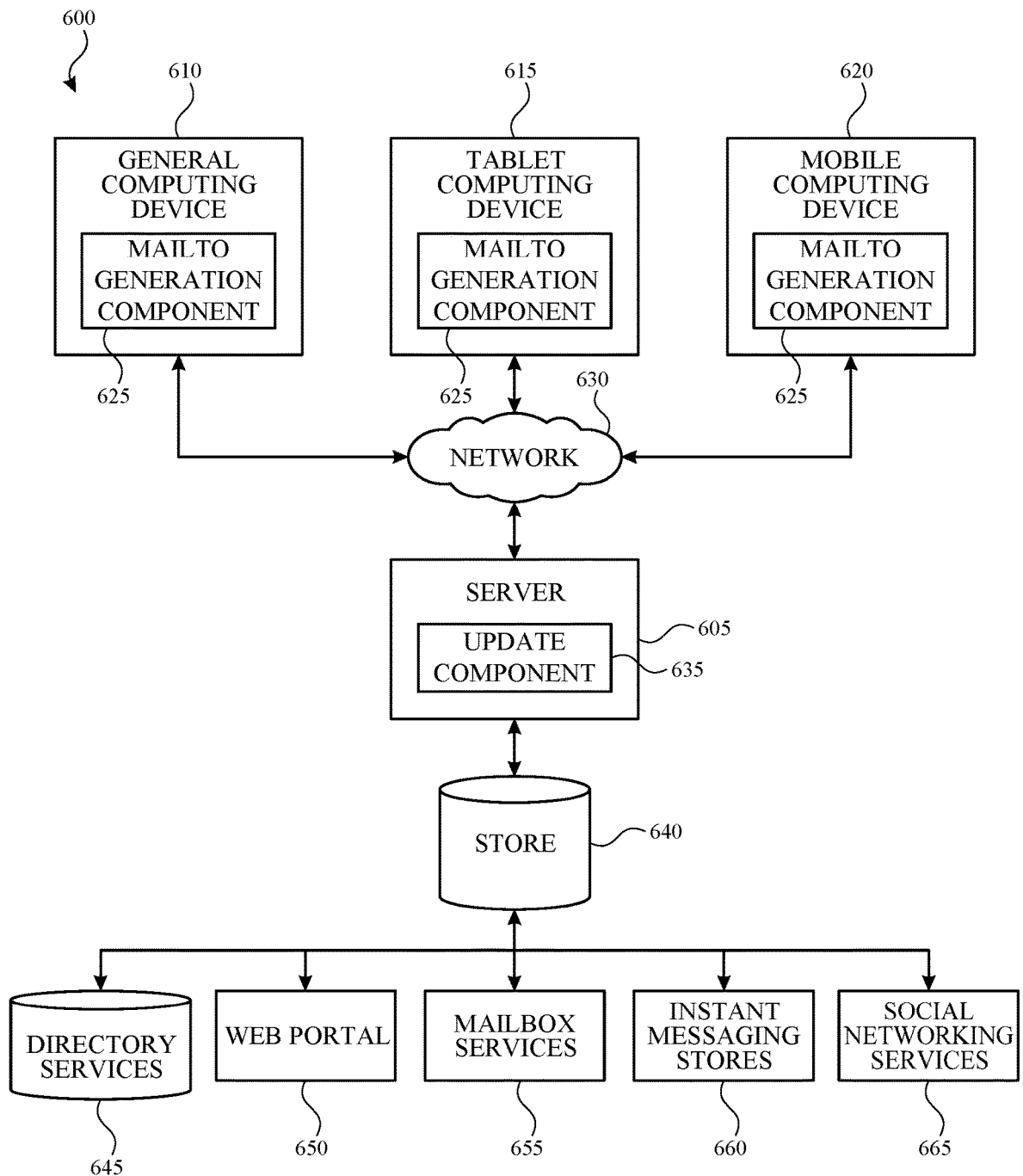
FIG. 6 is a simplified block diagram of a distributed computing system in which aspects of the present disclosure may be practiced.

FIG. 6 illustrates one aspect of the architecture of a system 600 for generating an mailto link and updating various action items such as described herein. The system may include a general electronic device 610 (e.g., personal computer), tablet electronic device 615, or mobile electronic device 620, as described above. Each of these devices may include a mailto link generation component 625 for generating various mailto links such as described. As the mailto link is generated and/or selected, an electronic message may be provided to the server 605, and a corresponding update component 635 over a network 630. The update component 635 parses the information contained in the message and provides a message, with the requested update, back to the requesting device.

In some aspects, the update component 635 may receive various types of information or content that is stored by the store 640 or transmitted from a directory service 645, a web portal 650, mailbox services 655, instant messaging stores 660, or social networking services 665.

By way of example, the aspects described above may be embodied in a general electronic device 610 (e.g., personal computer), a tablet electronic device 615 and/or a mobile electronic device 620 (e.g., a smart phone). Any of these embodiments of the electronic devices may obtain content from or provide data to the store 640.

As should be appreciated, FIG. 6 is described for purposes of illustrating the present methods and systems and is not intended to limit the disclosure to a particular sequence of steps or a particular combination of hardware or software components.

Figure 7:
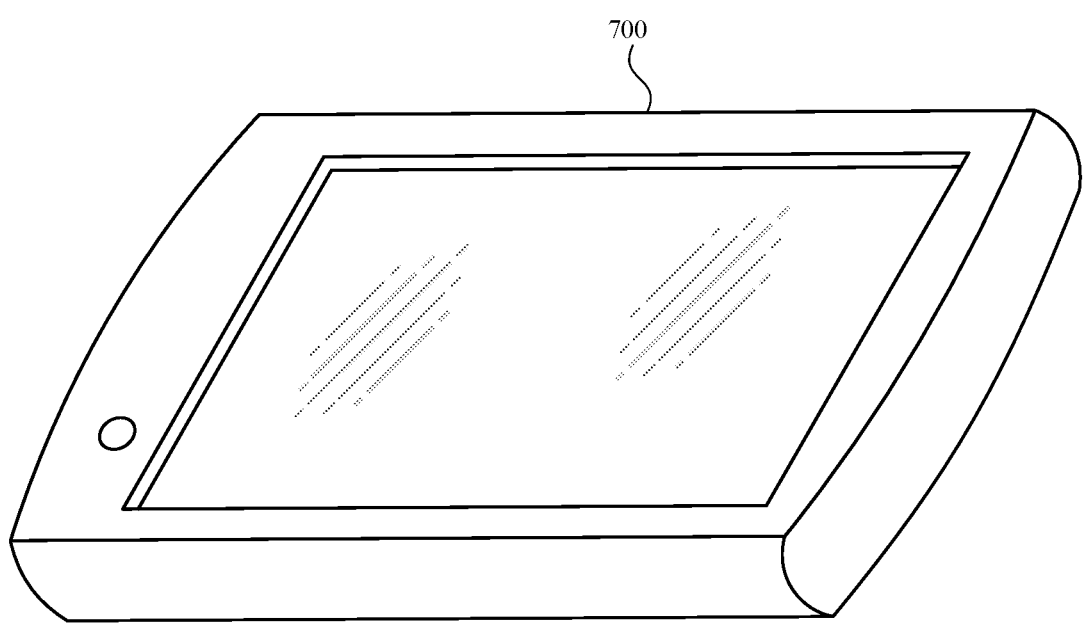
FIG. 7 illustrates a tablet computing device for executing one or more aspects of the present disclosure.

FIG. 7 illustrates an example tablet electronic device 700 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board electronic device displays or via remote display units associated with one or more electronic devices.

For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated electronic device is equipped with detection (e.g., camera) functionality for capturing and interpreting user gestures for controlling the functionality of the electronic device, and the like.

As should be appreciated, FIG. 7 is described for purposes of illustrating the present methods and systems and is not intended to limit the disclosure to a particular sequence of steps or a particular combination of hardware or software components.

Among other examples, the present disclosure describes a system comprising: a processing unit; and a memory storing computer executable instructions which, when executed by the processing unit, causes the system to perform a method, comprising: generating a mailto link for an electronic communication in an electronic communication application; appending a header to the mailto link that causes the electronic message to: be automatically sent to an intended recipient without generating an electronic message compose form; and automatically create or update an action item associated with the electronic communication application. In other aspects the system further comprises instructions for automatically populating an electronic communication address for the intended recipient. In other aspects, the electronic communication address is an email address. In other aspects the action item is associated with one or more of a task in the electronic communication application, a calendar item in the electronic communication application, or a meeting request associated with the electronic communication application. In other aspects, automatically updating the action item comprises cancelling the action item. In other aspects, the system further comprises instructions for determining whether the intended recipient is the same as the sender of the electronic communication. In other aspects, the system further comprises instructions for automatically updating sending the electronic communication to the intended recipient only when the intended recipient is the same as the sender of the electronic communication. In other aspects, a subject of the electronic communication contains information about the update for the action item.

Further aspects disclosed herein provide a method for updating an action item in an electronic communication application, comprising: receiving an input that indicates the action item that is to be updated; automatically generating a mailto link for an electronic communication that includes: an email address of the intended recipient; information about the action item that is to be updated including an update to be performed on the action item; and an indication that the electronic communication is to be automatically sent to the intended recipient; and sending the electronic communication to a remote computing device that parses the information contained in the electronic communication to identify the update on the action item. In further aspects, the electronic communication is generated and sent to the remote computing device without displaying a compose form. In further aspects, a determination is made as to whether the intended recipient is the same as a composer of the electronic communication. In other aspects, the electronic communication is automatically sent to the intended recipient when it is determined that the intended recipient is the same as the composer of the electronic communication. In further aspects, the action item is associated with one or more of a calendar item associated with the electronic communication application, a meeting request associated with the electronic communication application, and a task associated with the electronic communication application. In further aspects, the electronic communication is an email. In further aspects, the update is included in a subject portion of the electronic communication. In further aspects, the update is a request to cancel the action item. In further aspects, a communication containing the update from the remote computing device is received without displaying the communication in an inbox of the electronic communication application. In further aspects, the update is an indication that a task has been completed.

Other examples disclosed herein disclose an electronic communication for updating an action item in an electronic communication application, comprising: a mailto link comprising: an email address of an intended recipient; an identifier that is associated with the action item; a subject portion that indicates an update that is be performed on the action item; and an indication that the electronic communication is to be automatically sent to the intended recipient. In other aspects, the electronic communication is generated and sent in response to a single received input.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system, comprising:
   a processing unit; and
   a memory storing computer executable instructions that, when executed by the processing unit, causes the system to perform a method, comprising:
   in response to a single received input:
      generating a mailto link for an electronic communication in an electronic communication application, the mailto link comprising an email address of an intended recipient, an identifier associated with an action item and a subject portion that corresponds to an action to be performed on the action item; and
      appending a header to the mailto link that causes the electronic message to:
         be automatically sent to the intended recipient without generating an electronic message compose form; and
         automatically create or update the action item associated with the electronic communication application according to the identifier and the subject portion of the mailto link.

2. The system of claim 1, wherein the action item is associated with one or more of a task in the electronic communication application, a calendar item in the electronic communication application, or a meeting request associated with the electronic communication application.

3. The system of claim 1, wherein automatically updating the action item comprises cancelling the action item.

4. The system of claim 1, further comprising instructions for determining whether the intended recipient is the same as the sender of the electronic communication.

5. The system of claim 4, further comprising instructions for automatically sending the electronic communication to the intended recipient only when the intended recipient is the same as the sender of the electronic communication.

6. A method for updating an action item in an electronic communication application, comprising:
   receiving a single input that indicates the action item that is to be updated; and
   in response to receiving the single input:
      automatically generating a mailto link for an electronic communication without generating an electronic message compose form, the mailto link comprising:
         an email address of the intended recipient;
         an identifier associated with an action item and a subject portion that includes information about the action item that is to be updated including an update to be performed on the action item; and
         an indication that the electronic communication is to be automatically sent to the intended recipient; and
      automatically sending the electronic communication to a remote computing device that parses the information contained in the electronic communication to identify the update on the action item;
      automatically updating the action item according to the identifier and the subject portion of the mailto link.

7. The method of claim 6, further comprising determining whether the intended recipient is the same as a composer of the electronic communication.

8. The method of claim 7, further comprising automatically sending the electronic communication to the intended recipient when it is determined that the intended recipient is the same as the composer of the electronic communication.

9. The method of claim 6, wherein the action item is associated with one or more of a calendar item associated with the electronic communication application, a meeting request associated with the electronic communication application, and a task associated with the electronic communication application.

10. The method of claim 6, wherein the electronic communication is an email.

11. The method of claim 6, wherein the update is a request to cancel the action item.

12. The method of claim 6, further comprising receiving a communication containing the update from the remote computing device without displaying the communication in an inbox of the electronic communication application.

13. The method of claim 6, wherein the update is an indication that a task has been completed.

14. A method for generating an electronic communication for updating an action item in an electronic communication application, comprising:
   automatically generating a mailto link in response to a single received input without generating an electronic message compose form, the mailto link comprising:
      an email address of an intended recipient;
      an identifier that is associated with the action item;

a subject portion that includes information about an update that is be performed on the action item; and an indication that the electronic communication is to be automatically sent to the intended recipient; and sending the electronic communication to the intended recipient once the mailto link has been generated;

automatically updating the action item according to the identifier and the subject portion of the mailto link.

15. The method of claim 14, wherein the mailto link includes a header that specifies the electronic communication is to be automatically sent to the intended recipient.

16. The method of claim 14, wherein the mailto link includes an identifier associated with a second action item.

17. The method of claim 14, wherein the update is a request to cancel the action item.

18. The method of claim 14, wherein the update is an indication that a task has been completed.

19. The method of claim 14, further comprising receiving a communication containing the update from the remote computing device without displaying the communication in an inbox of the electronic communication application.

20. The method of claim 14, further comprising determining whether the intended recipient is the same as the sender of the electronic communication.

\* \* \* \* \*